United States Patent [19]

Lehmann et al.

[11] 3,997,952
[45] Dec. 21, 1976

[54] ROLL FOR A ROLLING MILL

[75] Inventors: Rolf Lehmann, Mutschellen, Aargau, Germany; Armin Siegfried, Zurich, Switzerland

[73] Assignee: Escher-Wyss Limited, Zurich, Switzerland

[22] Filed: Jan. 21, 1976

[21] Appl. No.: 650,921

[30] Foreign Application Priority Data

Jan. 29, 1975 Switzerland .................. 1059/75

[52] U.S. Cl. ................................ 29/115
[51] Int. Cl.² .............................. B60B 15/16
[58] Field of Search ......... 29/115, 116 R, 116 AD, 29/113 AD

[56] References Cited

UNITED STATES PATENTS

| | | | |
|---|---|---|---|
| 3,562,882 | 2/1971 | Widmer et al. ................. | 29/115 |
| 3,639,956 | 2/1972 | Justus .............................. | 29/116 R |
| 3,703,862 | 11/1972 | Appenzeller .................... | 100/162 B |
| 3,802,044 | 4/1974 | Spillman ......................... | 29/113 AD |
| 3,889,334 | 6/1975 | Justus et al. .................... | 29/115 |
| 3,949,455 | 4/1976 | Biondetti ........................ | 29/116 AD |
| R27,445 | 8/1972 | Kuehn ............................. | 29/116 R |

Primary Examiner—Wayne L. Shedd
Attorney, Agent, or Firm—Pennie & Edmonds

[57] ABSTRACT

A sag-compensating roll comprises a roll shell rotatable about a support beam with hydrostatic support means therebetween. The ends of the beam are supported in casings at each end of the roll. End sections of the roll shell are rotatably mounted in pivotally mounted arms in the casings which pivot about an axis spaced from the roll axis. Couplings between the end sections and the central portion of the roll shell provide centering while allowing pivoting movement therebetween. A drive shaft in one housing is coaxial with the pivot axis and drives the corresponding end section through a transmission. A drive motor is mounted on the casing. Three mutually perpendicular exterior surfaces of the casings permit assembly of a plurality of rolls to form a calender.

10 Claims, 8 Drawing Figures

ROLL FOR A ROLLING MILL

This invention relates to a sag-compensating roll for a rolling mill comprising a stationary support beam around which a roll shell rotates, and hydrostatic supporting means positioned between the support beam and the roll shell, the beam being mounted in supports at its ends.

A roll of this type is known, for example, from U.S. Pat. No. 3,802,044. When a rolling mill is constructed from prior art rolls, suitable uprights need to be provided, and there are difficulties with the drive of the individual rolls. Complicated drive means, for example with three ring bearings, may be required. Such drive means are expensive, and in many cases have an excessively large diameter which makes it difficult to assemble the rolls in the rolling mill.

It is an object of the present invention to provide a roll which is free from the aforementioned disadvantages and forms a construction element which can be assembled together with other construction elements in various ways as required to form a rolling mill, while at the same time being substantially simpler in construction and drive than the prior art rolls and rolling mills.

To this end the roll according to the invention is characterized in that the end sections of the roll shell are mounted to rotate in pivotally mounted arms in support casings at respective ends of the roll, the arms being pivotable about an axis spaced from the axis of rotation of the roll shell, and the ends of the support beam are mounted in the casings.

Such rolls can be designed so that a plurality of rolls can be assembled in various configurations as required for calender operations, etc. As a result, assembly is speeded up and inventory storage simplified.

According to a preferred embodiment of the invention, a drive shaft is mounted in one of the casings coaxial with the pivot axis of the arms, and is connected via a transmission to the roll shell. This makes possible a roll shell drive which is both simple and effective.

The transmission connecting the drive shaft to the roll shell is advantageously a gear transmission. However, other transmissions such as, for example, toothed belts, can also be used.

The drive shaft can be coupled to a drive motor attached to the casing. As a result the unit formed by the roll is complete with its own drive, thus further simplifying the assembly of a rolling mill.

The roll shell preferably has end sections which are pivotally mounted in the arms and are connected to the central shell portion via couplings which center the end sections and the central portion of the shell while permitting relative pivoting movement therebetween. This feature further simplifies the roll shell drive to a considerable extent, since for every position of the roll shell the end sections extend parallel with the pivot axis of the arms and therefore with the axis of the drive shaft. The coupling on the drive shaft side is advantageously designed to transmit driving torque to the central shell portion, while at the same time permitting mutual pivoting movements.

The casings advantageously have at least two parallel support surfaces, or define two parallel support planes, which enable a number of rolls to be assembled into a rolling mill. Preferably the casings have a third support surface, or define a third support plane, which is perpendicular to the two parallel surfaces or planes. As a result, rolling mills can be constructed not only in one plane, but also perpendicularly thereto, to form L- and Z-shaped calenders.

Embodiments of the invention will be described with reference to the accompanying drawings in which.

Figure 1:
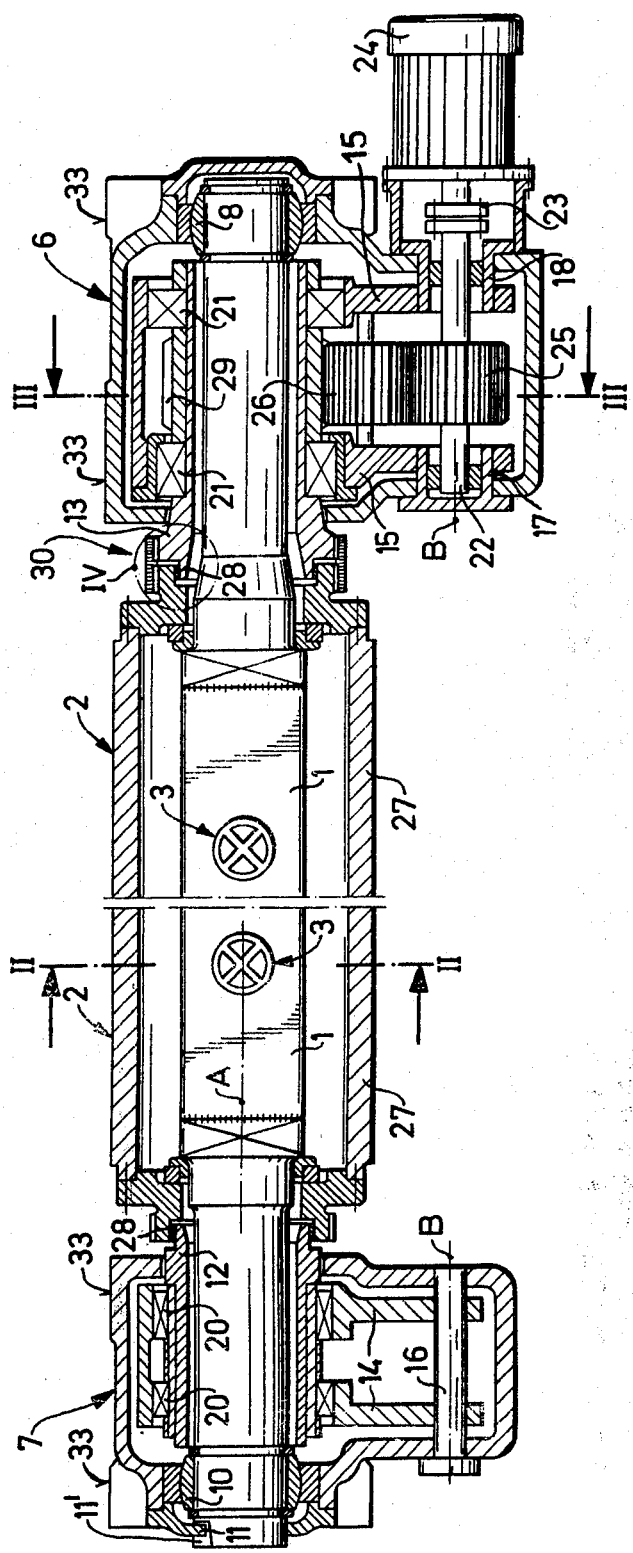
FIG. 1 is an axial section through a roll according to the invention.
Figure 2:
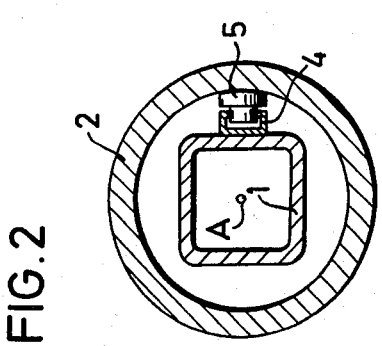
FIG. 2 is a section taken along the line II—II of FIG. 1.

The roll illustrated in section in FIG. 1 comprises a central support beam 1 around which a roll shell 2 rotates. The roll shell is supported on beam 1 by hydrostatic support elements 3 which are constructed, for example, in accordance with the aforementioned U.S. Pat. No. 3,802,044 and comprise pistons 5 guided in cylinders 4 (FIG. 2). The support elements 3 are connected to a pressure medium source via hydraulic lines (not shown). As can be seen from FIG. 1, a number of supporting elements 3 are provided along the beams 1. However, a strip, as also disclosed in the aforementioned U.S. patent, can alternatively extend along the roll shell 2 and form a single supporting element.

The beam 1 is mounted at its ends in casings 6, 7 by spherical bearings 8, 10. The spherical bearings allow the ends of the beam 1 to make pivoting movements in the casings 6, 7. The beam 1 is prevented from rotating in relation to the casings by a projection 11 of a cover attached to the casing 7 and engaging in a groove 11' in the beam.

As shown in FIG. 1, end sections 12, 13 of the roll shell 2 are rotatably mounted in pivotable arms 14, 15. Arms 14, 15 are pivotally mounted in casings 6, 7 for pivoting about an axis B which is spaced from the axis of rotation A of the shell. A pin 16 is provided for the pivotable bearing of the arm 14 in the casing 7. Arm 15 is pivotally mounted in the casing 6 by hollow pins 17, 18. At the ends remote from the pins 16, 17, 18, the arms 14, 15 have bearings 20, 21 for the outer end sections 12, 13 of the roll shell.

As also shown in FIG. 1, rotatably mounted in the hollow pins 17, 18 is a drive shaft 22 connected by a coupling 23 to an electric motor 24 attached to the casing 6. Affixed on the shaft 22 is a driving gear 25 meshing with an intermediate or idler gear 26 which meshes with an annular driven gear 29 affixed with the shell end section 13.

As can also be seen in FIG. 1, the end sections 12, 13 are connected to the central shell portion 27 via couplings 28 which allow the end sections 12, 13 to make a mutual relative pivoting movement in relation to the central shell portion, while at the same time centering such portion. On the drive side, i.e. on the side of the casing 6 between the end portion 13 and the central shell portion 27, is a torque coupling 30 which transmits the drive force from the end section 13 to the central shell portion 27, while at the same time permitting relative pivoting movement therebetween.

Figure 4:
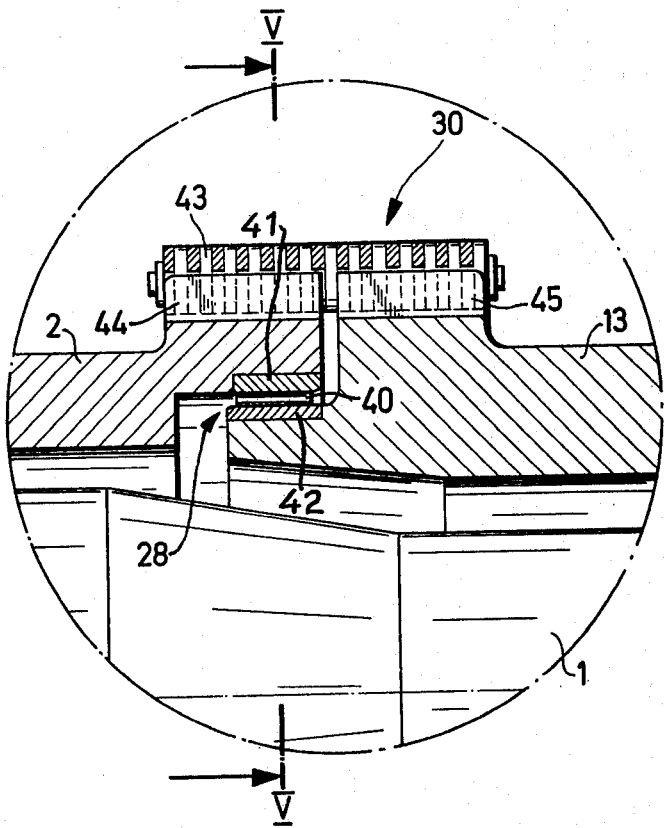
FIG. 4 is a detail of portion IV of FIG. 1 to an enlarged scale.
Figure 5:
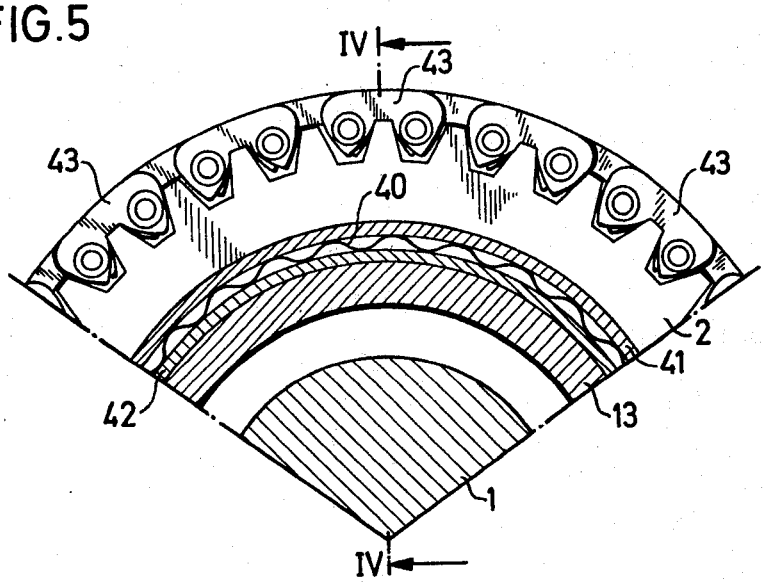
FIG. 5 is a section taken along the line V—V in FIG. 4.

The construction of the centering coupling 28 and the torque coupling 39 can be understood from FIGS. 4 and 5. The centering coupling 28 takes the form of an annular corrugated steel strip 40 constructed after the fashion of a so-called corrugated spring and disposed between bushing rings 41, 42 attached to the members 2 and 13, respectively. The torque coupling 30 comprises a gear chain 43 engaging in teeth 44, 45 of the members 2 and 13. The gear chain 43 takes the form of an endless ring enclosing the teeth 44, 45.

Figure 3A:
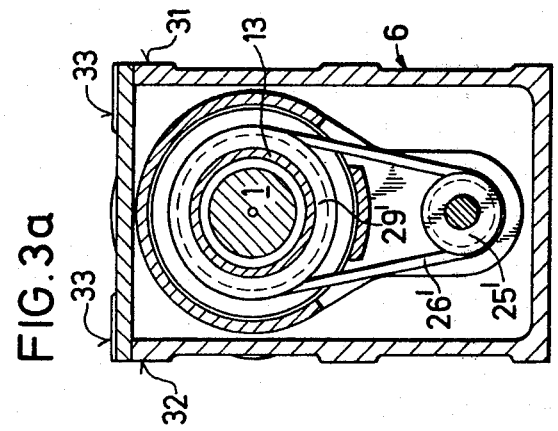
FIG. 3a is a section similar to FIG. 3 but showing an alternative form of drive means.
Figure 3:
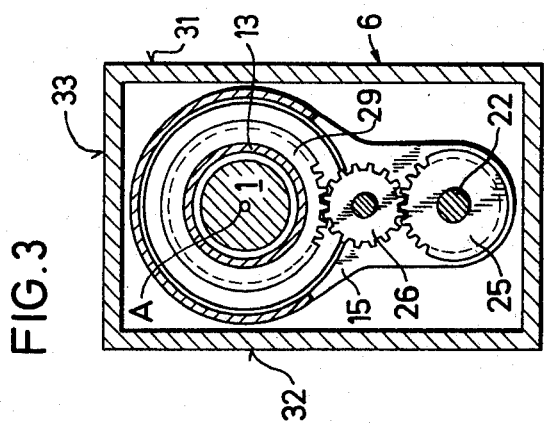
FIG. 3 is a section taken along the line III—III of FIG. 1.

As shown in FIG. 3a, a belt or a chain transmission can be substituted for the gear transmission of FIG. 3, to drive the roll shell 2. In such case belt pulleys or sprocket wheels 25', 29' interconnected via a belt or chain 26' are substituted for the gears 25, 29 of FIG. 3.

As shown in FIGS. 1 and 3, the casings 6, 7 have exterior support surfaces 31–33. Surfaces 31 and 32 are parallel with one another, and surface 33 is perpendicular to surfaces 31, 32. In both casings 6, 7 the surfaces 31–33 are at an equal distance from the axis A of the roll, and extend parallel to the axis of rotation of the shell end section therein.

Figure 6:
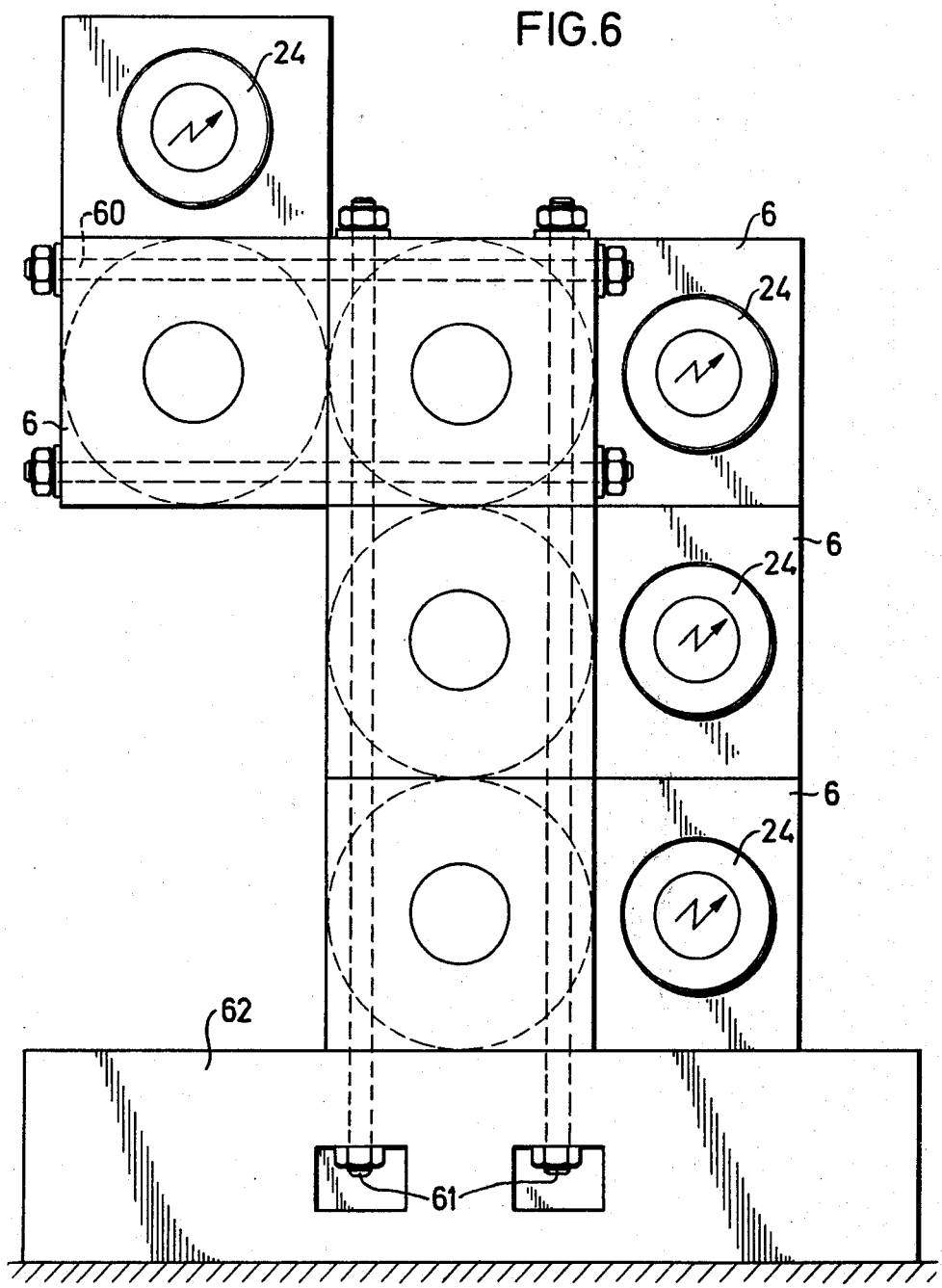
FIG. 6 is a diagrammatic side elevation of an L-shaped calender assembled from rolls according to the invention.

As shown in FIG. 6, the support surfaces 31–33 enable a number of rolls to be assembled into a calender. FIG. 6 shows an L-shaped calender with four rolls. The casings 6, 7 of the rolls (only the casings 6 are shown in FIG. 6) are bolted together via tie rods 60, 61 and attached to a base plate 62. Assembly is very simple, since the individual rolls have their own driving motors 24.

Figure 7:
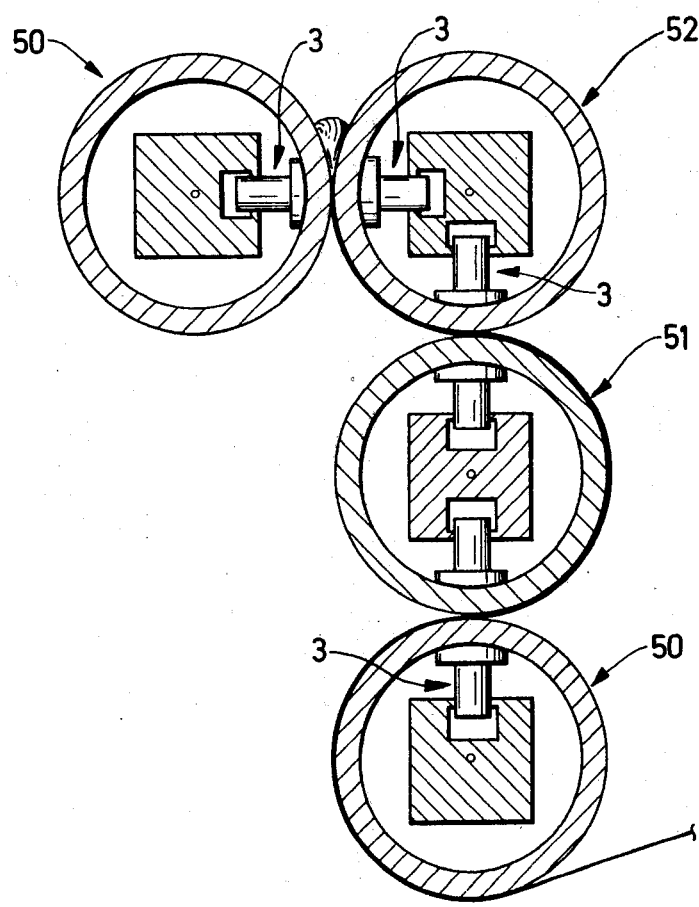
FIG. 7 is a section corresponding to FIG. 2, through the calender illustrated in FIG. 6.

FIG. 7 is a section through the rolls of the calender illustrated in FIG. 6, showing the arrangement of the hydrostatic supporting elements in the individual rolls. Two rolls 50 have a single row of supporting elements 3, roll 51 has two rows of supporting elements which lie in the same plane, and roll 52 has two rows of supporting elements which are disposed perpendicularly to one other.

Instead of exterior surfaces which are flat over their entire area, as shwon in FIG. 3, the exterior surfaces may have spaced flat sections which define respective support planes, as shown in FIG. 3a.

We claim:

1. A sag-compensating roll for a rolling mill comprising a roll shell rotatable about a support beam, hydrostatic support means positioned between said support beam and said shell for exerting support forces on the shell, a pair of casings at respective ends of said roll, means for mounting the ends of said support beam in said casings, pivotally mounted arms in said casings pivotable about an axis spaced from the axis of rotation of said roll shell, and means for rotatably mounting end sections of said roll shell on said arms.

2. A roll according to claim 1 including a drive shaft mounted in one of said casings coaxial with the pivot axis of said arms, and drive means for connecting said drive shaft with the end section of the roll shell in said one casing.

3. A roll according to claim 2 in which said drive means includes a gear transmission having a driving gear affixed with said drive shaft and a driven gear affixed with said end section of the roll shell.

4. A roll according to claim 2 including a drive motor mounted on said one casing for driving said drive shaft.

5. A roll according to claim 1 including couplings between said end sections of the roll shell and the central portion of the roll shell for centering the end sections and the central portion while allowing relative pivoting movement therebetween.

6. A roll according to claim 5 including a drive shaft mounted in one of said casings coaxial with the pivot axis of said arms, and drive means for connecting said drive shaft with the end section of the roll shell in said one casing, the coupling between the end section in said one casing and the central portion of the roll shell being designed and adapted to transmit driving torque to the central portion.

7. A roll according to claim 6 including a drive motor mounted on said one casing for driving said drive shaft.

8. A roll according to claim 1 in which said casings each have exterior surfaces defining two parallel planes which are parallel to the axis of rotation of the respective end section therein.

9. A roll according to claim 8 in which said casings each have an exterior surface defining a plane perpendicular to said two parallel planes and parallel to the axis of rotation of the respective end section therein.

10. A roll according to claim 7 in which said casings each have exterior surfaces defining two parallel planes and a plane perpendicular thereto, the planes being parallel to the axis of rotation of the respective end section therein.

* * * * *